March 22, 1949.  W. FREIDEN  2,464,973
CROP BLOWER
Filed Nov. 13, 1944  2 Sheets-Sheet 2
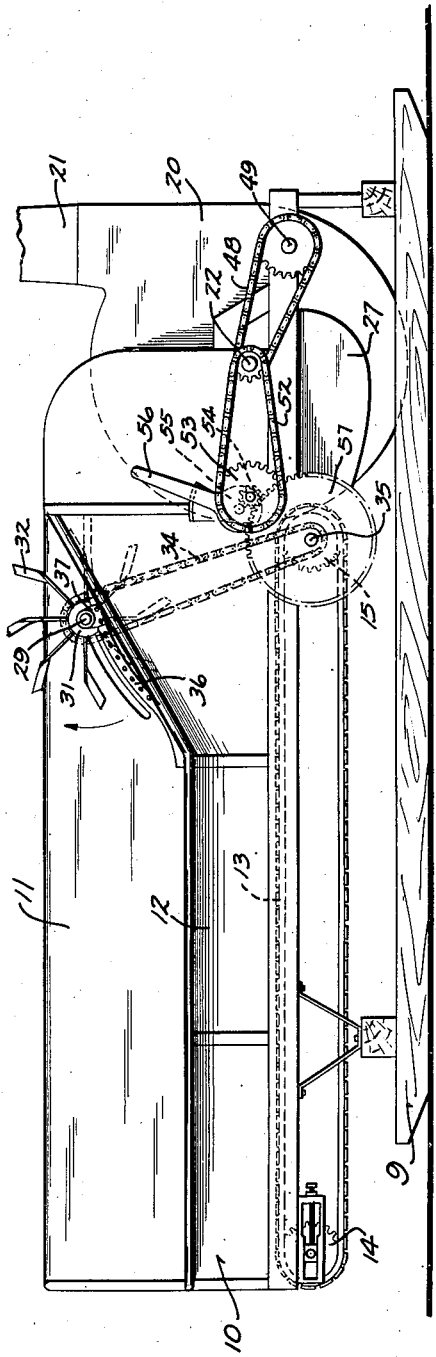
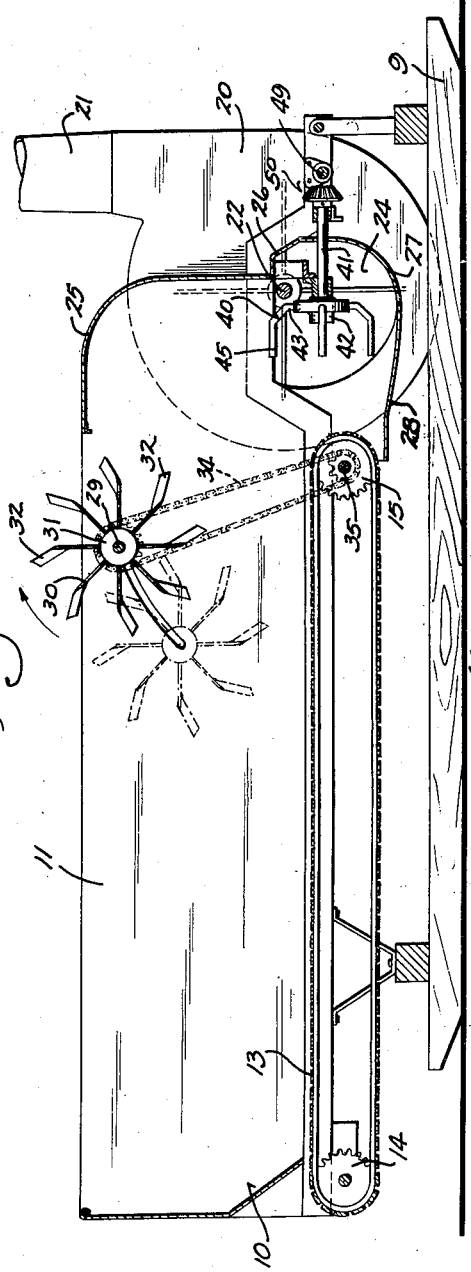
INVENTOR
WILLIAM FREIDEN
BY
Wheeler, Wheeler & Wheeler
ATTORNEYS.

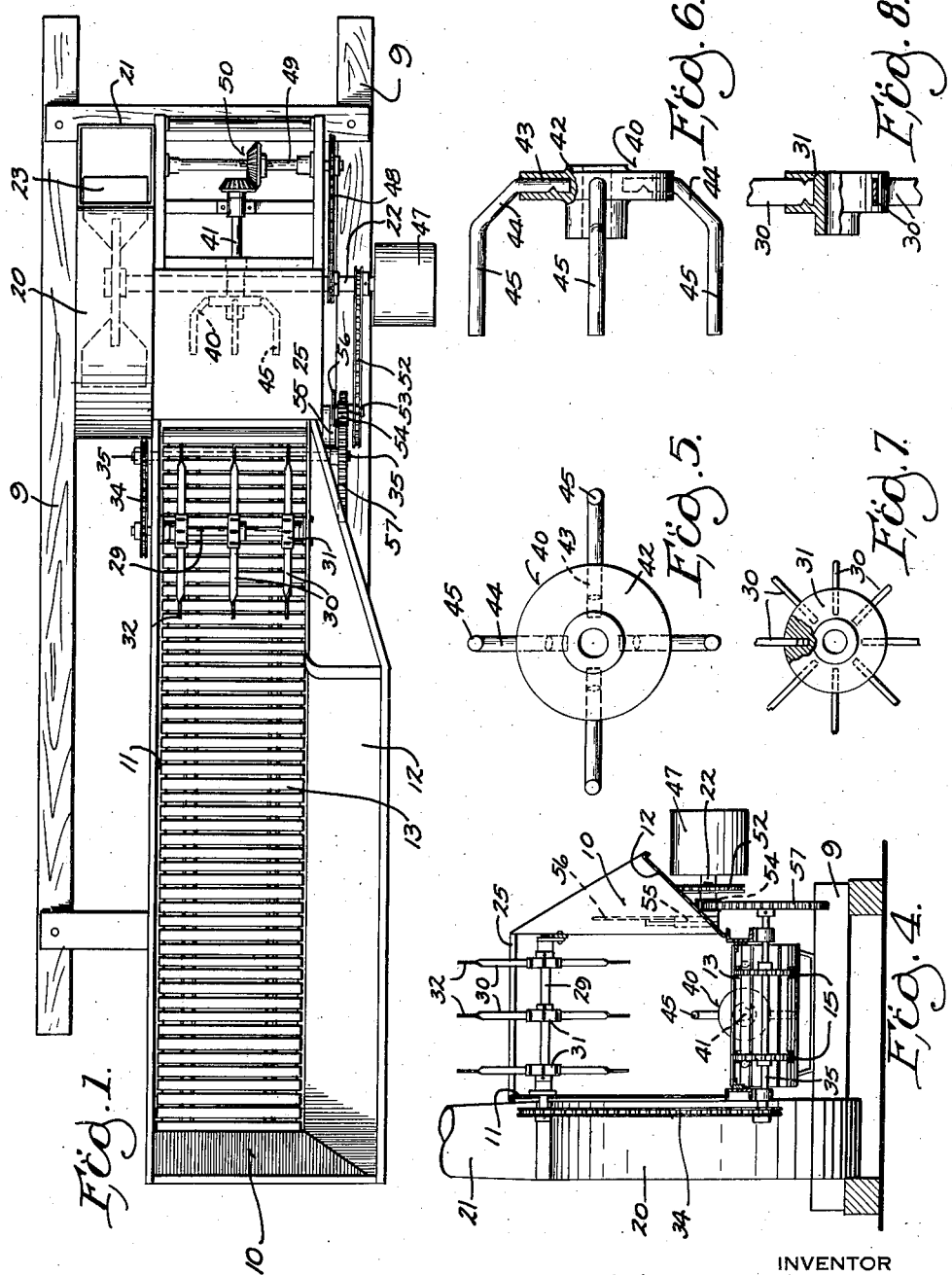

Patented Mar. 22, 1949

2,464,973

UNITED STATES PATENT OFFICE 2,464,973

CROP BLOWER

William Freiden, Appleton, Wis., assignor to Eagle Manufacturing Company, Appleton, Wis., a corporation of Wisconsin Application November 13, 1944, Serial No. 563,288

14 Claims. (Cl. 302—37)

This invention relates to improvements in crop blowers.

In the pneumatic delivery of cut forage crops, considerable difficulty is experienced, particularly when the forage is green, due to the tendency of the material to ball up and pass erratically to the blower so that the blower at one instant may be overloaded and at another instant may be running light. The object of the present invention is to pass such material substantially uniformly to the blower and, thereby, to improve the speed of delivery and decrease the power requirements and increase the capacity of devices of this character.

More specifically stated, it is my purpose to levelize short lengths of flexible material in a mat enroute to the blower and, thereafter, to provide for the substantially continuous and uniform delivery to the blower of advancing portions of the mat, to the end that the blower may be constantly and uniformly fed.

Other objects of the invention will be apparent to those skilled in the art upon analysis of the following disclosure thereof.

In the drawings:

Fig. 1 is a plan view of the apparatus embodying the invention.

Fig. 2 is a side elevation of the apparatus shown in Fig. 1.

Fig. 3 is a longitudinal section through the apparatus shown in Fig. 1.

Fig. 4 is a detail view in transverse section through the apparatus shown in Fig. 1.

Fig. 5 is a front elevational view in detail on an enlarged scale of the distributor.

Fig. 6 is a view partly in side elevation and partially broken away to a longitudinal section through the distributor shown in Fig. 5.

Fig. 7 is a fragmentary detail view of a hub portion of the leveling device as it appears in front elevation, portions being broken away to expose the blade mounting.

Fig. 8 is a side elevational view of the hub shown in Fig. 7, portions being broken away to a longitudinal section, disclosing the blade mounting.

Like parts are designated with the same reference characters throughout the several views.

While it is immaterial how my apparatus is supported, I have shown it mounted on a skid frame 9. In a broad sense, it is also immaterial how the material is delivered to the apparatus or whether it is cut in the apparatus or is delivered subsequently. For the purposes of this disclosure, I have shown a hopper at 10, having a high and substantially vertical rear wall at 11 and a lower inclined wall at 12 over which the material will be fed onto the slat-type conveyor 13, which operates over sprockets 14 and 15 longitudinally of the hopper bottom.

The blower casing 20 stands at one side of the path of the conveyor and immediately beyond its end.

The discharge conduit 21 leading from the blower casing is preferably directed upwardly. The blower shaft 22 extends transversely of the frame into the casing where it supports a runner 23 in the usual manner.

The blower casing has an inlet opening 24 which, as is best shown in Fig. 3, is mostly below and to the left of the shaft 22, although it extends somewhat to the right of the shaft and somewhat above it also. As viewed in Fig. 3, the blades of the blower fan or runner 23 must obviously rotate counterclockwise directly past the inlet opening 24 so that material delivered through such opening in the path of the blades is immediately delivered up the delivery spout 21.

A hood 25 closes the space above the blower shaft 22 and is offset at 26 to connect with a boot 27 which follows the outline of the blower inlet 24 to the bottom of the inlet opening and thence extends rearwardly at 28 to a point beneath the delivery end of the conveyor 13.

Vertically adjustable above the conveyor 13 is a leveling device which comprises a shaft 29 and a number of sets of blades 30 mounted in their respective hubs 31, preferably being cast in the hubs to project radially therefrom, as best shown in Figs. 7 and 8. The direction of rotation of the shaft 29 is clockwise, as viewed in Fig. 3, and the ends of the blades are bent slightly backwardly with reference to the clockwise rotation of the blades and are also twisted, as best appears in Figs 1 and 4, to act edgewise in throwing rearwardly, as indicated at 32, the material advancing with conveyor 13, but piled to an undue depth thereon. Thus the several blades, in the course of their rotation, function to produce an approximately level mat or blanket of cut material on the conveyor 13 as the upper flight of the conveyor moves to the right in Figs. 1, 2 and 3.

The shaft 29 with which the leveling blades 30 rotate, is driven by chain 34 from the shaft 35 on which the forward sprockets 15 of the conveyor 13 are located. An arcuate guideway is provided at 36 for the bearings 37 of the leveling shaft 29, such guideway being concentric to the shaft 35 and provided with spaced bolt holes for fastening the bearings 37 in selected positions at various distances above the conveyor. Thus the level to which the material on the conveyor will be reduced can be controlled in accordance with any desired rate of feeding, without requiring any means for varying the length of the chain 34.

The mat or layer of material on the conveyor discharges from the delivery end thereof onto the boot 27, 28, as will clearly appear from Fig. 3. As it does so, it falls into the path of the feeding device shown at 40 in Fig. 3 and Fig. 4, and illustrated in detail on a larger scale in Figs. 5 and 6. The shaft 41 on which this device is mounted, is preferably disposed beyond the conveyor, but approximately on the longitudinal center line thereof. The hub 42 is mounted at the end of this shaft and is cast about the initially radial portions 43 of supports which are obliquely bent at 44 and have their operating arms extending directly forwardly toward the conveyor at 45. As viewed from the direction in which the material approaches this distributing or feeding device (see Fig. 5), the hub 42 comprises a rather large disk from which only the portions 44 and the arms 45 project. The arms 45 describe an approximately cylindrical path in the preferred embodiment disclosed.

The feeding device 40 is located directly laterally opposite the intake opening 24 of the blower. As fast as the blanket or layer of material is delivered by the conveyor 13, the feeding device disintegrates the blanket or layer and feeds it in uniform volume to the blower. As long as the conveyor continues to deliver a layer of material in substantially uniform depth, the feeder 40 will maintain the rate of delivery of the material to the blower substantially constant, precluding any balling or erratic feeding.

The blower shaft 22 preferably comprises the main driving shaft, being provided with a pulley 47 for receiving power from any outside source. The belt or chain 48 transmits motion from the shaft 22 to the shaft 49 which, through the bevel gearing at 50, drives the feeder or distributor shaft 41.

Another chain or belt at 52 transmits motion from the main drive shaft 22 to a combination gear 53 and pinion 54 mounted on an eccentric 55 controlled by hand lever 56 by which the pinion 54 may be moved to and from engagement with the gear 57 on the conveyor driving shaft 35. The arrangement allows the conveyor and leveling device to be started and stopped at will, while the blower and its distributing feeder 40 continue in operation. The distributing feeder is preferably permanently coupled with the blower shaft to avoid any possibility of clogging the blower or the boot over which the material is delivered to the blower.

I claim:

1. The combination with a feeding conveyor, and a blower having a casing provided with an inlet immediately beyond the delivery end of the conveyor and at one side thereof, of a rotary distributing device in the angle between the conveyor and the blower inlet and comprising a distributing head and a shaft disposed substantially in a direction longitudinal respecting the conveyor and upon which said head is mounted to receive material axially from the conveyor and to deliver such material laterally to the blower inlet.

2. The device of claim 1, in which the shaft is substantially centered forwardly of the conveyor and the head comprises arms extending in a general direction axially of the shaft toward the conveyor at points radially spaced outwardly from the shaft.

3. A feeding device comprising the combination with a feeding conveyor and means for leveling material to a mat of predetermined thickness thereon, of means for distributing the material of the mat substantially uniformly in a direction laterally of the conveyor, said last named means comprising a rotary head disposed forwardly of the delivery end of the conveyor and comprising radially offset arms projecting toward the conveyor.

4. The device set forth in claim 3, in combination with a blower comprising a fan casing having an inlet disposed laterally adjacent and slightly beyond the delivery end of the conveyor and in a position to receive material distributed by said arms together with a hood and boot extending from the fan casing about the inlet opening thereof and about said device and arranged to receive and support and confine material delivered from said conveyor during operation of said arms on said material.

5. A device of the character described, comprising the combination with a hopper, of a conveyor operable along the bottom of the hopper, means adjustable as to height for leveling material on the conveyor, a fan shaft transversely spanning the hopper forwardly of the conveyor, a fan on the shaft at one side of the conveyor, a casing enclosing the fan and having an inlet disposed forwardly of the delivery end of the conveyor, a distributor shaft extending toward the conveyor from a point longitudinally in advance thereof, and a distributor head mounted on the shaft opposite the fan casing inlet and rotatable with the shaft in a direction to distribute toward the inlet a layer of material delivered from the conveyor toward said head.

6. The device of claim 5, in which the distributor head comprises a hub and arms mounted in the hub at predetermined radial spacing outwardly from said shaft and projecting forwardly from the hub toward the conveyor.

7. The device of claim 5, in which a boot spans the hopper forwardly of the conveyor to provide a bottom therefor, said boot being connected with the fan casing about the inlet thereof to assist in guiding into the fan casing the material acted upon by the distributor head.

8. The device of claim 5, in which the fan and distributor head have common driving connections, and the leveling device has driving connections provided with means for interrupting the transmission of motion to the leveling device without interrupting the transmission of motion to the fan and said head.

9. The structure set forth in claim 5, in which the leveling device comprises a shaft having outwardly extending arms, and bearing means provided with a guideway upon which said shaft may be bodily adjusted as to its height above said conveyor.

10. The combination with an endless belt conveyor, a feedway boot extending laterally from the delivery end of the conveyor, a rotary fan blower having its casing provided with a suction inlet eccentric to the axis of rotation and with which the delivery end of the boot connects, a rake mounted above the conveyor and provided with movable rake teeth and driving connections for the operation of said teeth in a direction opposite to the direction of conveyor movement therebeneath for distributing material on the conveyor in a direction opposite that in which the carrying portion of the conveyor travels, and an agitating conveyor in the boot comprising means for lifting and distributing material in the boot in the direction of said blower inlet.

11. The combination set forth in claim 10, in which the rake for distributing material on the conveyor comprises a rotary distributing shaft transversely mounted above the conveyor and provided with an annular series of radially extending arms having their free ends in sufficient proximity to the conveyor to lift and distribute material thereon in a rearward direction when the shaft is rotated in a direction to carry said arms rearwardly through the material on the conveyor.

12. The combination as set forth in claim 10, in which the rake for distributing material rearwardly on the conveyor comprises a transverse shaft having bearings adjustable for shaft operation at varying distances from the carrying portion of the conveyor and provided with raking teeth, said shaft having driving connections for its actuation in a direction to cause said teeth to move downwardly and rearwardly through the material underneath the shaft when the latter is rotated.

13. The combination with an endless belt conveyor, a feedway boot extending laterally from the delivery end of the conveyor and a blower having a suction inlet with which the delivery end of the boot connects, of a transverse rotary distributing shaft above the conveyor and provided with an annular series of radially extending arms, and power driven means for rotating the shaft, said shaft being adjustable at varying distances from the conveyor to regulate the depth at which its distributing arms may enter material carried by the conveyor.

14. The combination with an endless belt conveyor having means for distributing material thereon to a substantially uniform depth, of a boot providing a surface at the delivery end of the conveyor for receiving and supporting the delivered material, and a rotary distributing head spaced from the delivery end of the conveyor and provided with an annular series of arms having free ends extending in the direction of the conveyor and in sufficient proximity to said supporting surface to lift and throw the material in a lateral direction when said head is rotated.

WILLIAM FREIDEN.

REFERENCES CITED

The following references are of record in the file of this patent:

UNITED STATES PATENTS

| Number | Name | Date |
| --- | --- | --- |
| Re. 13,156 | Vraalstad | Oct. 11, 1910 |
| 540,102 | Kirshman | May 28, 1895 |
| 576,149 | Raasch et al. | Feb. 2, 1897 |
| 614,979 | Price | Nov. 29, 1898 |
| 660,159 | Hixon et al. | Oct. 23, 1900 |
| 733,289 | Silver | July 7, 1903 |
| 1,020,307 | Parker | Mar. 12, 1912 |
| 1,349,948 | Echterling | Aug. 17, 1920 |
| 1,936,173 | Orth | Nov. 21, 1933 |
| 2,280,394 | Grindle | Apr. 21, 1942 |
| 2,324,042 | Swenson | July 13, 1943 |
| 2,410,501 | Huddle | Nov. 5, 1946 |